(12) United States Patent
Igo

(10) Patent No.: US 6,748,690 B2
(45) Date of Patent: Jun. 15, 2004

(54) RATCHETING ADJUSTABLE DUCK DECOY

(76) Inventor: Matthew C. Igo, 13377 W. Persimmon St., Boise, ID (US) 83713

( * ) Notice: Subject to any disclaimer, the term of this patent is extended or adjusted under 35 U.S.C. 154(b) by 0 days.

(21) Appl. No.: 10/371,933

(22) Filed: Feb. 21, 2003

(65) Prior Publication Data

US 2003/0177686 A1 Sep. 25, 2003

Related U.S. Application Data

(63) Continuation-in-part of application No. 10/100,836, filed on Mar. 15, 2002.

(51) Int. Cl.$^7$ ............................................. A01M 31/06
(52) U.S. Cl. ............................................................. 43/3
(58) Field of Search ................................................ 43/3, 2

(56) References Cited

U.S. PATENT DOCUMENTS

| | | | |
|---|---|---|---|
| 235,845 A | 12/1880 | Appleton | |
| 390,587 A | * 10/1888 | Gammon | 43/3 |
| 747,732 A | 12/1903 | Kremer | |
| 836,823 A | 11/1906 | Oliver et al. | |
| 883,161 A | 3/1908 | Rosentreter | |
| 1,110,245 A | 9/1914 | Vaughan | |
| 1,392,065 A | 9/1921 | Klock | |
| 1,409,285 A | 3/1922 | Dennett | |
| 1,571,213 A | * 2/1926 | Pitts | 43/3 |
| 1,571,711 A | * 2/1926 | Dewey | 43/3 |
| 1,789,649 A | 1/1931 | Gazecki et al. | |
| 1,813,370 A | * 7/1931 | Villatore et al. | 43/3 |
| 2,162,786 A | 6/1939 | Oeding | |
| 2,185,013 A | * 12/1939 | Bonetti | 43/3 |
| 2,268,963 A | * 1/1942 | Riddell | 43/3 |
| 2,342,107 A | 2/1944 | Agius | |
| 2,430,645 A | 11/1947 | Mills et al. | |
| 2,746,195 A | 5/1956 | Renwick, Jr. | |
| 2,835,064 A | * 5/1958 | Webb | 43/3 |
| 3,000,128 A | 9/1961 | McAda | |
| 3,001,128 A | 9/1961 | McAda | |
| 3,074,195 A | 1/1963 | Vanderpool | |
| 3,689,927 A | 9/1972 | Boston | |
| 3,758,975 A | 9/1973 | Curtis | |
| 4,251,937 A | 2/1981 | Curley | |
| D268,047 S | 2/1983 | Fulster | |
| D270,656 S | 9/1983 | Fulster | |
| 4,450,642 A | 5/1984 | DeKezel et al. | |
| 4,612,722 A | * 9/1986 | Ferrell | 43/3 |
| 4,674,219 A | * 6/1987 | Chargo et al. | 43/3 |
| 4,757,630 A | * 7/1988 | Torberg | 43/3 |
| 4,768,988 A | * 9/1988 | Rutter | 43/3 |
| 4,827,653 A | * 5/1989 | Sewell | 43/3 |
| 5,016,385 A | 5/1991 | Blease | |
| 5,172,507 A | 12/1992 | Francheshini | |
| 5,367,813 A | * 11/1994 | Cherry | 43/3 |
| 5,377,439 A | * 1/1995 | Roos et al. | 43/3 |
| 5,515,637 A | 5/1996 | Johnson | |
| 5,902,163 A | 5/1999 | Baruzzi et al. | |
| 6,088,944 A | 7/2000 | Jones | |
| 6,339,895 B1 | * 1/2002 | Lawson | 43/3 |
| 6,357,161 B1 | 3/2002 | Best | |
| 6,470,621 B2 | * 10/2002 | Murray et al. | 43/3 |
| 6,560,912 B1 | * 5/2003 | Achepohl | 43/3 |
| 2003/0097778 A1 | * 5/2003 | Pippert | 43/2 |

* cited by examiner

Primary Examiner—Darren W. Ark
(74) Attorney, Agent, or Firm—Derek H. Maughan; Frank J. Dykas; Robert L. Shaver

(57) ABSTRACT

A decoy for attracting waterfowl having an upper body portion adjustably pivotally connected to a keel by an attachment device. The attachment device allows the keel to be alternatively oriented and locked into a variety of desired positions and orientations. This allows the decoys to maintain a non-parallel orientation between the keel and the upper body and allows the decoy to maintain a desired orientation within a body of water when acted upon by a wind or water current. An anchor connected to the keel provides a means for maintaining the decoy in a generally fixed location. This combination of features allows the orientation of a group of decoys to be varied so as to provide a desired natural looking presentation.

5 Claims, 6 Drawing Sheets

RATCHETING ADJUSTABLE DUCK DECOY

PRIORITY

This application is a Continuation-in-Part of application Ser. No. 10/100,836 entitled Adjustable Duck Decoy filed on Mar. 15, 2002. The contents of which are incorporated herein by reference.

BACKGROUND OF THE INVENTION

1. Field of the Invention

The present invention generally relates to duck and waterfowl decoys, and more particularly to a decoy having an adjustable keel for varying the orientation and profile of a decoy in a body of water.

2. Background Information

Waterfowl decoys have been used for many years in various applications to attract waterfowl to desired areas. Typically, the user will arrange a collection of decoys in a body of water such as a lake, pond or river for the purpose of attracting live birds to the area. It is the intent of the party using the decoys to mimic the presentation of a group of waterfowl in an area, thus inducing real waterfowl to the area.

Most decoys are comprised of an upper body portion and a lower body portion. The upper portion is shaped and designed to resemble the appearance of a duck, goose, swan or other waterfowl. A bottom portion provides a surface that displaces a quantity of water sufficient to allow the decoy to float. However, flat decoys can be overturned by a strong wind or by the movement of water in a current. This results in the presentation of the decoys wherein the upper body portion is below the water. This is not always a desired orientation or presentation of the decoys.

This problem has been overcome in some applications by the presence of a weighted keel. These keels are aligned with the head and tail of the decoy and are intended to maintain the decoys in a desired floating position, the upper portion of the decoy above the water and the lower portion of the decoy below the water. The attachment of most keels is directed such that when the decoys are placed in a body of water having a current, such as a stream or river, the keel aligns with the direction of the current. In situations where a current of wind is placed upon decoys in a body of water, the keel will align with the direction of the wind. In as much as most keels are aligned in a fixed orientation parallel with an axis formed by the head and tail of a decoy, decoys will align parallel with the direction of the wind or water current.

When a series of prior art decoys are used to simulate a group of waterfowl, all of the waterfowl will align with the current, this results in a less natural and less effective appearance. In a natural habitat, live individual waterfowl often face in various directions with regard to wind or water currents as they take part in their daily activities. Most existing decoys having a fixed parallel keel cannot be oriented or placed in these various directions. On the contrary, when placed in a body of water having a current or when exposed to wind, these decoys will align to form lines parallel to the direction of the current. This configuration appears unnatural and limits the ability of the decoy to attract birds flying overhead.

Accordingly, it is an object of the present invention to provide a duck decoy for use in a body of water having a current. Another object of the invention is to provide a decoy with a non-parallel aligned keel that allows for a more natural configuration and placement of decoys in a natural setting. A further object of the invention is to provide an adjustable keel that allows the position of the keel on the decoy to be selected and locked in a desired orientation with regard to the orientation of the decoy.

SUMMARY OF THE INVENTION

These objects are achieved using a waterfowl decoy having a selectively adjustable keel. The decoy is made up of a waterfowl shaped upper portion that is adjustably pivotally connected to a keel. The keel has a first end and a second end and is connected to the upper portion of the decoy through an attachment device. The attachment device is configured to allow a party to select a desired orientation of the keel and then to lock this keel in the desired orientation so that a non-parallel orientation between the direction of the keel and the alignment of the head and the tail are maintained. The attachment device has a plurality of predefined locking positions that are configured so as to define a plurality of positions in which the device can be oriented. An anchor is connected to an anchor-connecting portion of the device so that the device is maintained in a desired orientation and location.

When the decoy is placed in a body of water and acted upon by a wind or water current, the keel aligns within the current, and the body of the decoy is maintained in a desired orientation with regard to the orientation of the keel. The non-parallel orientation of the keel and the upper portion of the decoy allow the direction of a plurality of decoys to be varied so as to provide a desired natural looking arrangement of decoys. In a desired situation, various modifications may be included for this device including various modifications of the shape of the keel, the weight of the keel or the manner in which the adjustment device allows a party to adjustably selectively pivot and lock the decoy in a desired orientation. This combination of features allows a party to place a set of a desired number of decoys in a variety of desired orientations such that the presentation of the decoy setting will be natural and lifelike without significant regard to adverse weather or water conditions.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive.

DESCRIPTION OF THE PREFERRED EMBODIMENTS

Figure 1:
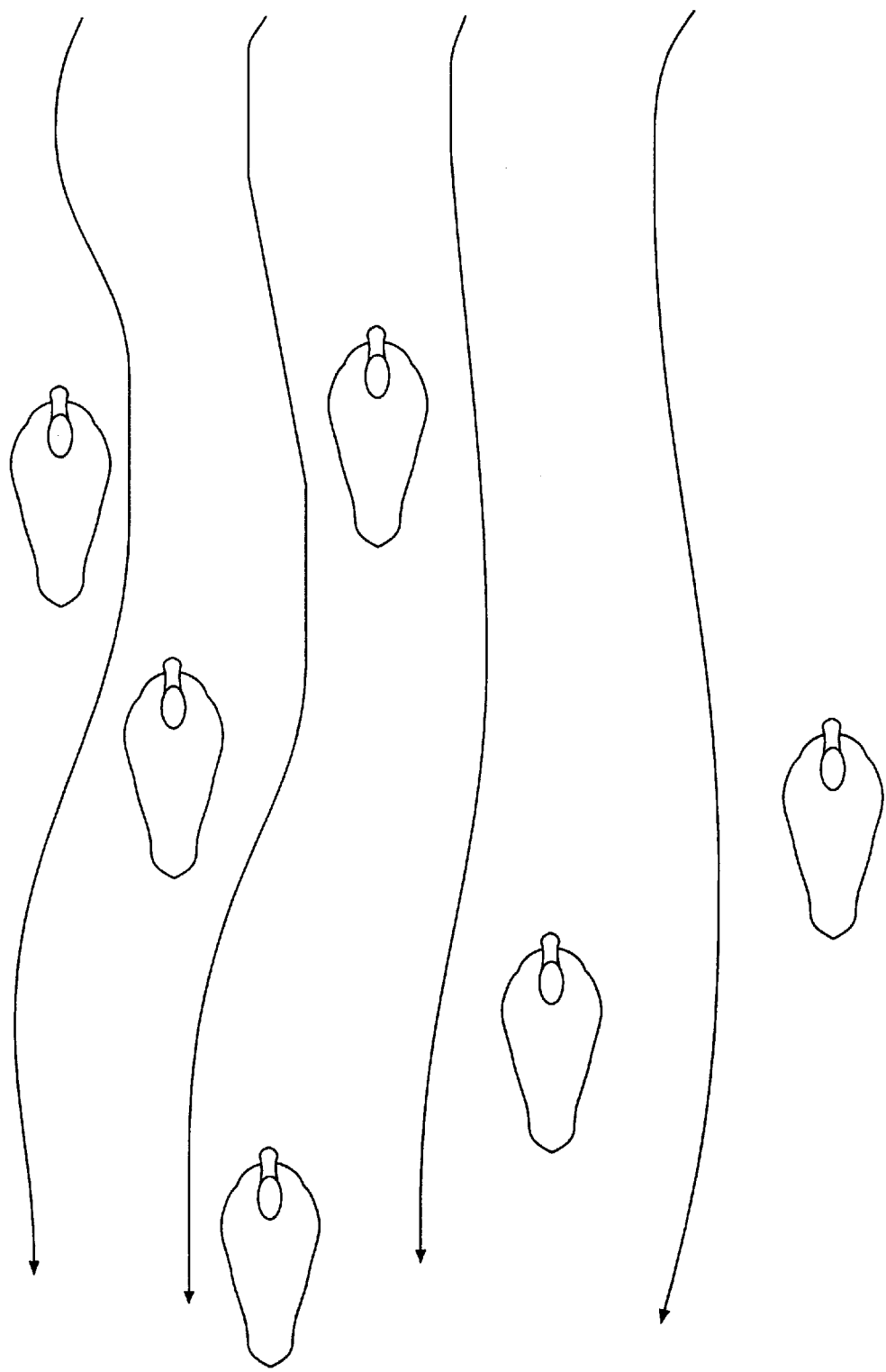
FIG. 1 is a top plan view of decoys in a prior art embodiment in use.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

This invention is a decoy for use in attracting waterfowl. The decoy has a pivotally adjustable keel that enables the decoy to be moved and locked into a variety of different positions within a generally horizontal plane. This allows the decoys to be placed in such a manner so as to provide a more natural presentation, particularly when used in a body of water affected by a wind or water current. In a preferred embodiment of the invention, this keel is connected to the upper portion of the device by an attachment device that allows the decoy to be adjustably oriented and held in a desired position by a pivoting and locking mechanism.

In the prior art, decoys are used in various applications to attract waterfowl to desired areas. Typically, the user will arrange a collection of decoys in a body of water such as a lake, pond or river for the purpose of attracting live birds to the area. Most decoys either have no keel, which makes them susceptible to being overturned by a strong current or the wind, or a fixed parallel keel aligned with the head and tail of the decoy. These parallel decoys only allow the orientation of the head and tail of the decoys to align in a direction parallel with the current. When these decoys are placed in a body of water having a current, the decoys will align so that the heads of the decoys are positioned either into or away from the direction of the current. When a series of decoys are used to simulate a group of ducks, all of the ducks will align with the current resulting in a less natural and less effective appearance. A top view of this alignment of prior art decoys is shown in FIG. 1.

Figure 2:
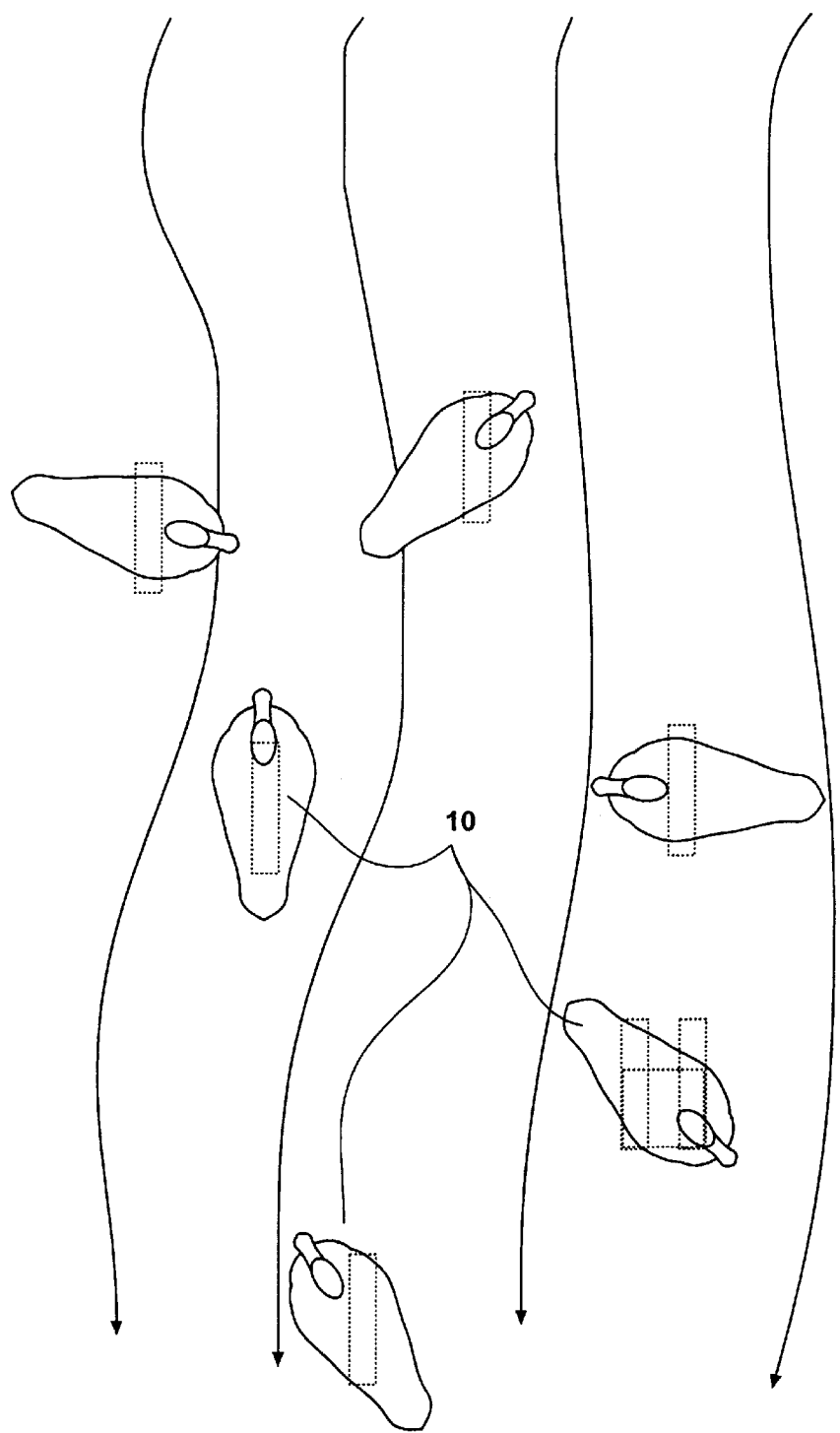
FIG. 2 is a top plan view of decoys from the present invention in use.

In a natural habitat, individual waterfowl are often facing in various directions including perpendicular to the stream or wind currents and between perpendicular and parallel to these currents. The present invention permits decoys to be arranged in a more natural pattern when placed in a body of water affected by a wind or water current. A top plan view of this arrangement of the decoys of the present invention 10 is shown in FIG. 2. This more natural orientation is achieved by the use of the present invention.

Figure 3:
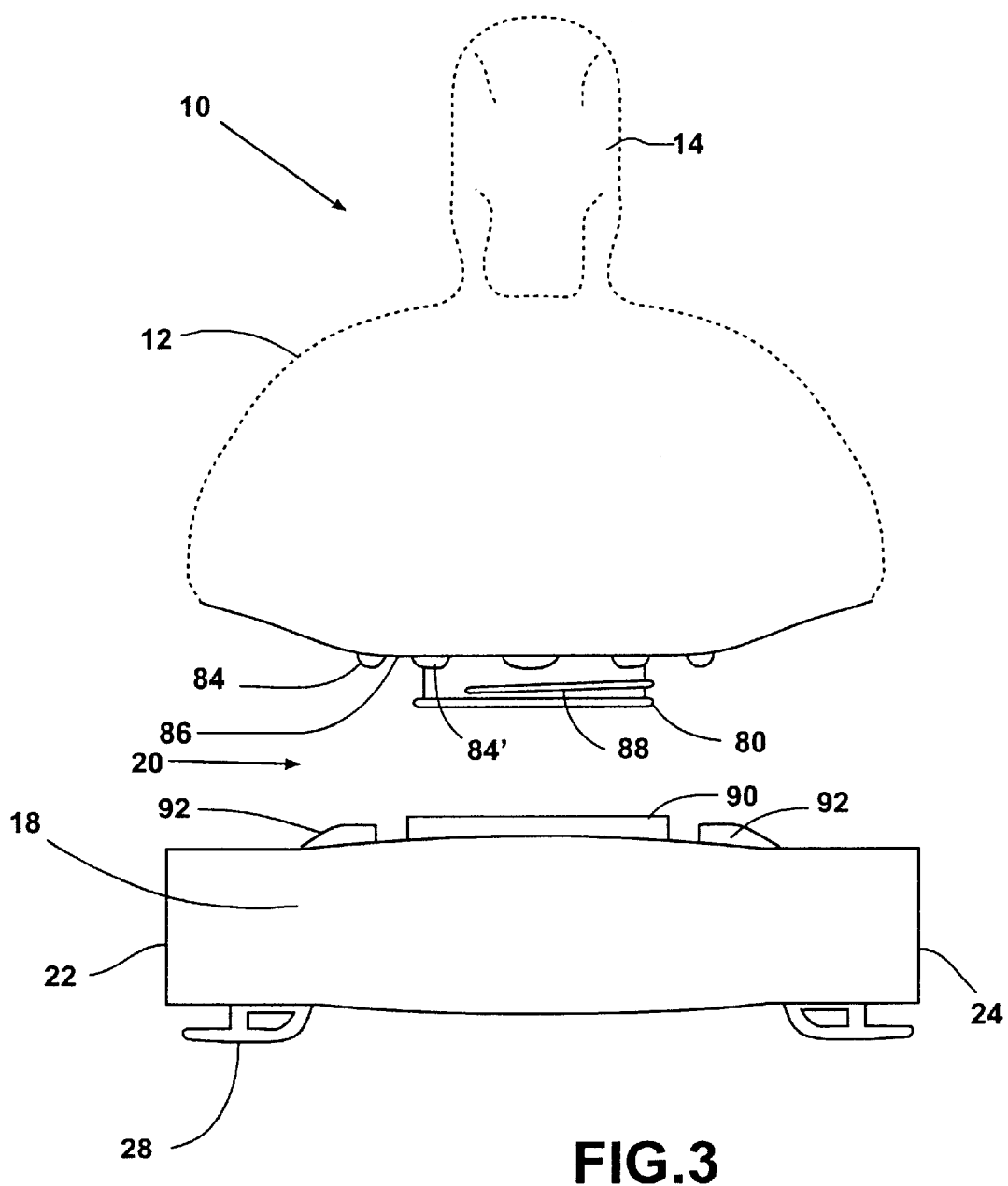
FIG. 3 is a front assembly view of the present invention in a first orientation

Referring now to FIG. 3, a front assembly view of a preferred first embodiment of the present invention is shown. The invention comprises a decoy 10 having an upper portion 12 designed to have the appearance of a form of waterfowl. The upper portion 12 having a head 14 and a tail 16 (shown in FIG. 4) and other features desired to enable the decoy to have the presentation of the type of waterfowl that is desired. The upper portion 12 is connected to a keel 18 through an attachment device 20.

This attachment device 20 is configured to allow a portion of the keel 18 to connect with the upper portion 12 of the decoy 10 in such a way that the keel 18 may be variously rotated and locked in a variety of desired positions. In this preferred embodiment the attachment device 20 is made up of a post 80 attached to a post plate 82 (shown in FIG. 4) This post plate 82 has a plurality of post plate projections 84, which are positioned around the post 80 in a generally circular pattern so as to surround the post 80. These post plate projections 84 define a plurality of post plate positions, which are configured to engage a catcher projection 92. The post 80 is configured to be received with a cup 90. A threaded portion 88 of the post is configured to engage with a compatibly threaded portion of the cup 90. This engagement assists to hold the cup 90 and the post 88 together in a vertically secured, yet horizontally pivotable position.

In this embodiment, the post 80, post plate 82, post plate projections 84, and post plate positions 86 are molded as a portion of the upper portion and the duck decoy. However, it is to be understood that this is not the only way that these portions may be attached to a duck decoy. In other embodiments, the post 80, post plate 82, post plate projections 84, and post plate positions 86 may alternatively be connected to the decoy by another bonding device or method. In addition, it is to be understood that the placement of the cup 90 and the catcher projections 92 need not be uniquely placed upon the keel 18. Nor that the post 80, post plate 82, post plate projections 84, and post plate positions 86 be uniquely positioned upon the upper portion of the decoy 12. It is to be understood that this configuration may be variously altered so that the cup 90 and post 80 are placed on alternatively the upper portion 12 of the decoy 10 or the keel 18. In addition, the catcher projection 92 and the post plate positions 86 may be placed alternatively upon the upper portion 12 of the device or upon the keel 18 depending upon the necessities of desires of the user.

In other embodiments, the post plate positions 84 may be defined as indentations with a post plate 82 or within portion of the upper body 12 of the decoy. In addition, other types of attachment mechanisms may be utilized to allow a user to selectively twist the keel 18 into a desired position and to lock this keel 18 within this desired position. The keel 18 should also be able to be removed from this locked position and repositioned in another position according to the necessities or desires of the user.

In the preferred embodiment, the position of the keel 18 with regard to the upper portion 12 of the decoy is changeable from a first selected and locked position to a second selected and locked position and from this second selected and locked position to a third selected and locked position and so forth. This variability is accomplished by being able to manually twist the keel 18 so as to move the catcher projection 92 from one post plate position 86 to another. While in this embodiment the device is shown as having two catcher projections 92 that are configured to align within two generally linearly aligned post plate positions 86, it is to be understood that this positioning is not limited thereto but may be variously embodied to achieve the same desired results. It is also to be understood that various modifications and alternative constructions may be included within this device and are contemplated by this invention. This includes, but is not limited to, embodiments where compatibly arranged teeth are included as a part of the attachment device 20, or embodiments where two or more of the attachment devices described in the present invention are included within the attachment devices.

Examples of specific forms of attachment devices 20 which may be used include, but are not limited to, a ratchet housing and pawl, adjustable pins that insert into the decoy at various positions, adjustable clamps that releasably hold the decoy at various positions, or other known devices which allow for adjustable rotation about an axis. The location of the means of attachment 20 may be at any position on the decoy 10 according to the desires of the user.

Figure 4:
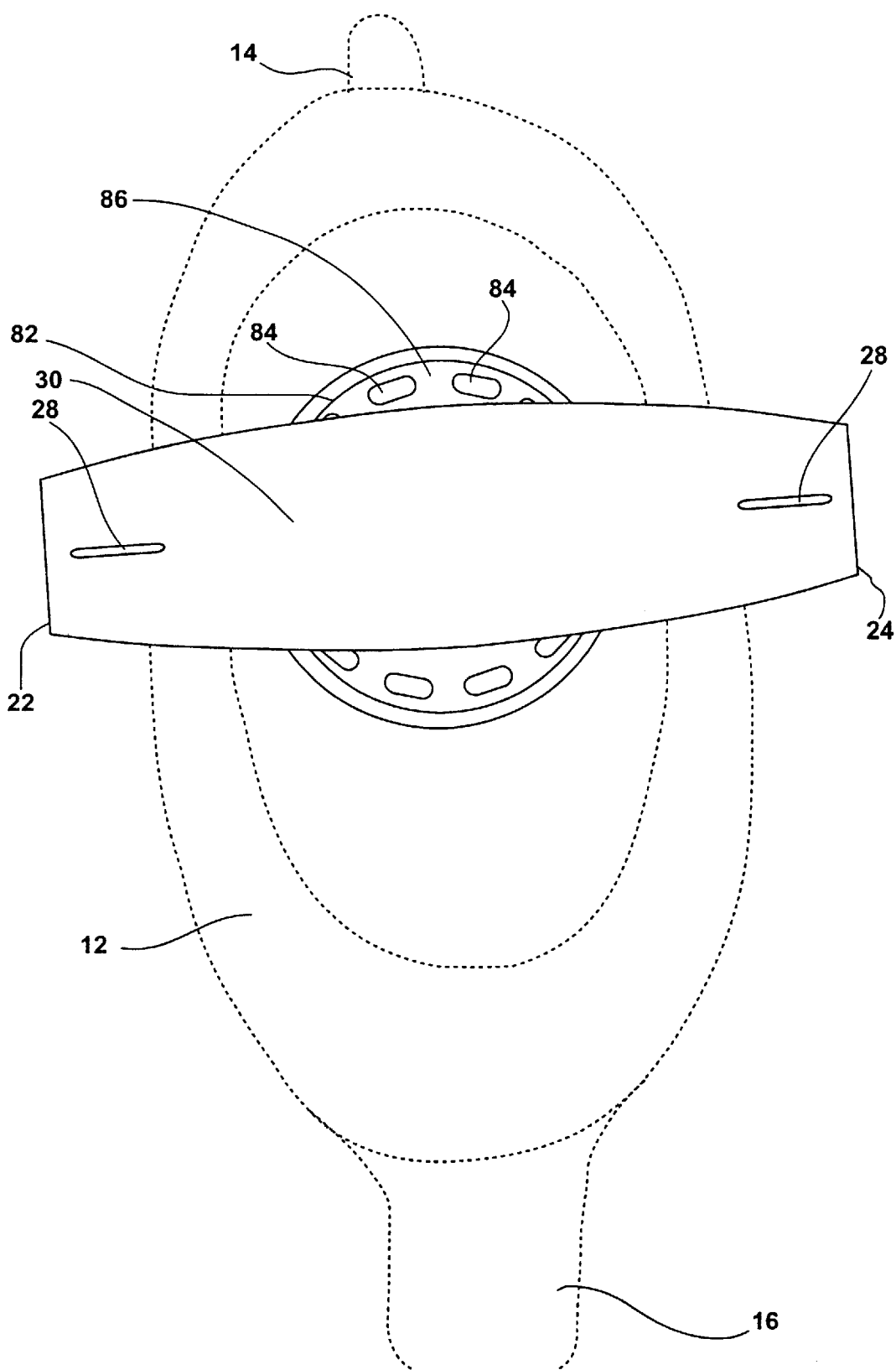
FIG. 4 is a bottom plan view of the invention in a first orientation.

FIG. 4 shows a bottom plan view of the embodiment shown in FIG. 3. In this figure the keel 18 is placed in a desired orientation with regard to the axis of the head 14 and tail 16 of the decoy. In this embodiment, the keel 18 has a first end 22 and extends to a second end 24 along a longitudinal axis. The keel 18 is dimensioned to be hollow with open ends 22, 24 and the portion nearest its center 30 configured to be wider in diameter than the end portions of the device. This design allows water to pass through the keel, and allows the keel 18 to be lighter when out of the water but to have the functionality of a weighted keel when within the water, thus allowing the decoy to be more stable when in the water. In this embodiment the keel 18 is a piece of rigid non-metallic conduit. However any material or shape, solid or hollow, may be used as long as it achieves the function of serving as a keel. Anchor attachment portions 28 are positioned near the first and second ends of the keel 22, 24. These anchor attachment portions 28 provide superior position of the decoys while in use. If so desired, an anchor may be connected to one of these attachment portions 28 so as to maintain the decoy in a desired orientation and position. The particular share or type of anchor may be dependent upon the needs of the needs of the user. Depending upon the necessities of the user the colors and pattern of the keel 18 can be painted a color such as orange so as to better approximate the color of a real duck's feet.

Figure 5:
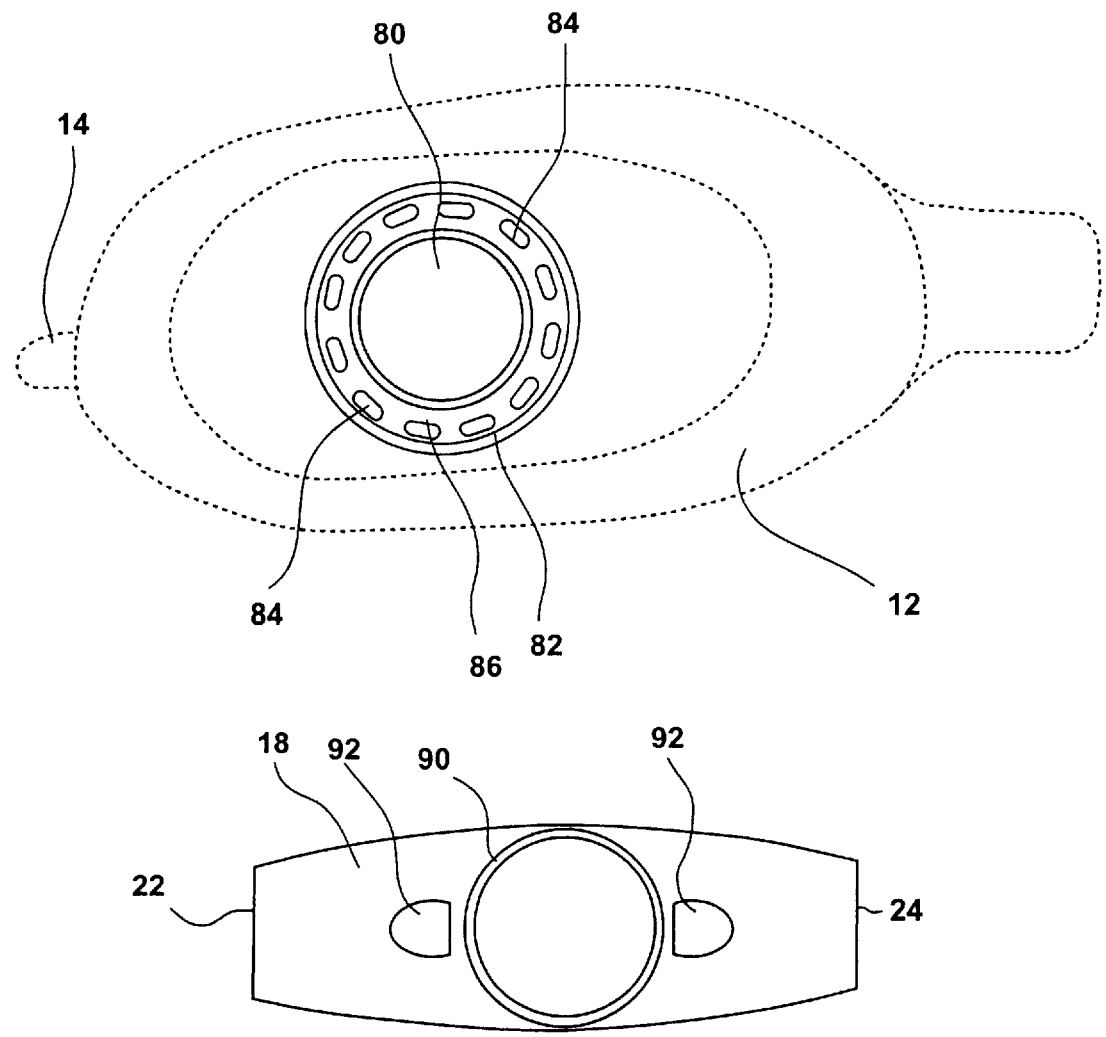
FIG. 5 is a bottom plan view of the upper portion of a duck decoy, and a top plan view of the keel of the keel.

FIG. 5 shows a detailed view of the device of the attachment device portions of the present invention.

Figure 6:
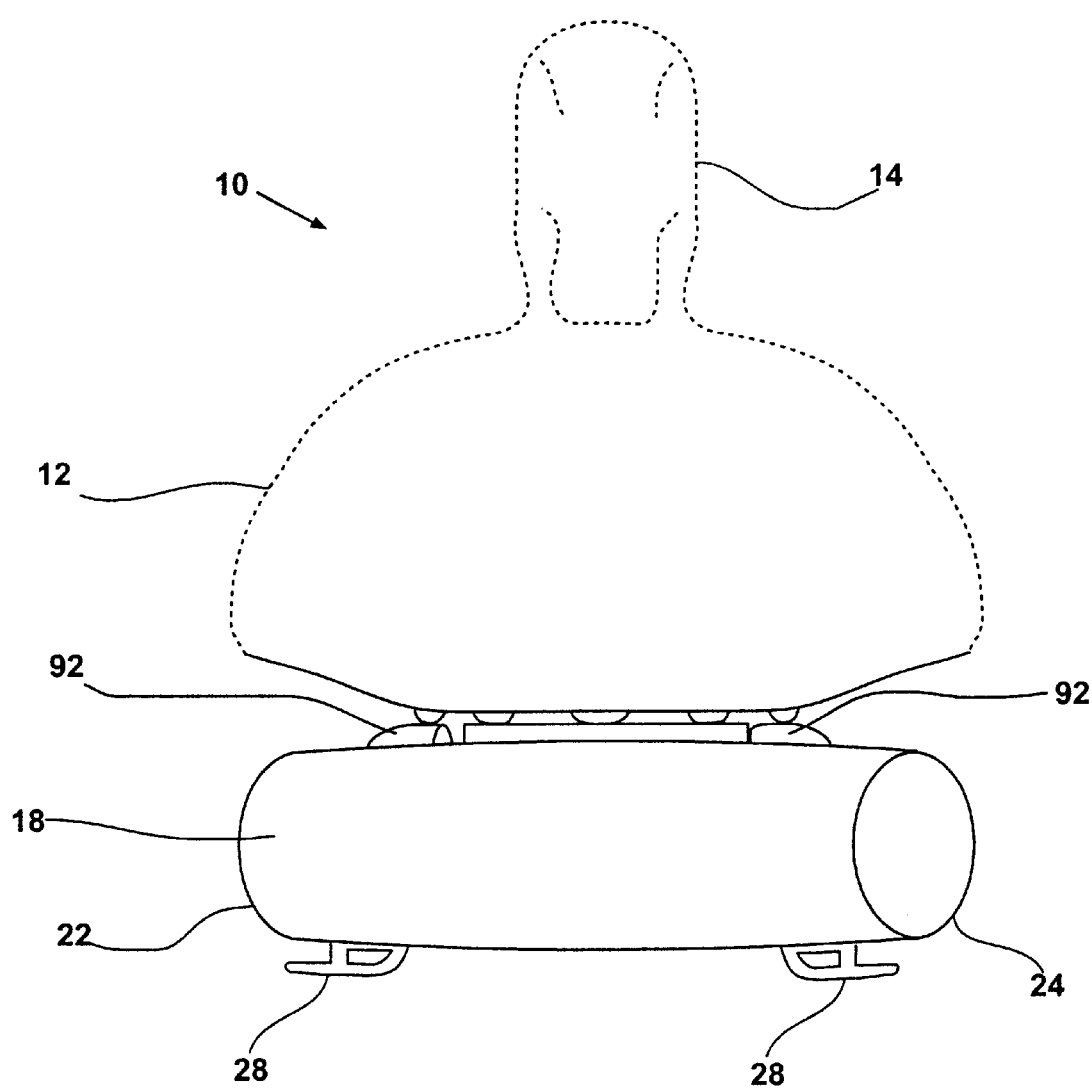
FIG. 6 is a front view of the present invention with the keel directed in a second orientation.

FIG. 6 shows a front-end view of the device in a desired orientation. The generally divergent position of the keel 18 with regard to the orientation of the head 14 allows the keel 18 to align within a current within a body of water and for the upper portion 12 of the device to be oriented divergent to this current. In the positioning of decoys in a location where the water has no current, the divergent orientation of the keel 18 with regard to the upper portion 12 of the decoy 10 stabilizes the orientation of the upper body 12 and allows the decoys to remain in a more lifelike and realistic orientations where they are less likely to align along a common current. The adjustably pivotable connection device 20 allows the orientation and positioning of the various duck decoys to be obtained.

In use, the decoy 10 is placed in water. The shape and materials of the decoy 10 allow the decoy 10 to float. The keel 18 is positioned in such a way that the keel 18 is oriented parallel within the direction of the current and non-parallel to the axis of the upper portion of the decoy defined by the head 14 and tail 16. The upper portion 12 of the decoy 10 is adjusted to a desired position, which may be parallel or non-parallely oriented with regard to the keel 18 and the direction of the current. In some embodiments, the orientation of the keel 18 is fixed in a non-parallel orientation with regard to the upper portion 12, while in other embodiments the direction of the keel 18 and the upper portion 12 is adjustable.

While there is shown and described the present preferred embodiment of the invention, it is to be distinctly understood that this invention is not limited thereto but may be variously embodied to practice within the scope of the following claims.

From the foregoing description, it will be apparent that various changes may be made without departing from the spirit and scope of the invention as defined by the following claims.

I claim:

1. A decoy for use in attracting waterfowl, said decoy comprising:

an upper portion having a first end shaped like a head and extending along an axis to a second end shaped like a tail;

a keel having a catcher portion extending therefrom, said keel adjustably pivotally connected to said upper portion in a generally vertical plane whereby said keel is positioned in a generally horizontal plane when connected to said upper portion, said keel having a first end and extending to a second end along a longitudinal axis, said longitudinal axis of said keel positioned generally parallel to said axis of said upper portion;

an attachment device fixedly attached to said upper portion, said attachment device having a plurality of projections extending from a surface, said plurality of projections defining a plurality of gaps therebetween, said gaps each configured to receive said catcher portion therein, said attachment device configured to adjustably pivotally connect said keel to said upper portion in a manner whereby said catcher is received in one of said gaps between a pair of said projections to lock said keel relative to said upper portion, wherein said keel is pivotally adjustably only within the horizontal plane in which it is positioned.

2. The decoy of claim 1 wherein said keel is a generally hollow tube having an open first end and an open second end and defining a hollow passageway therebetween.

3. A decoy for use in hunting waterfowl comprising:

an upper portion having a first end shaped like a head and extending along an axis to a second end shaped like a tail;

a keel adjustably pivotally connected to said upper portion, said keel having a first end and extending to a second end along a longitudinal axis, said keel and said upper portion lie in independent parallel horizontal planes;

an attachment device connecting said upper portion to said keel, said attachment device comprising a catcher projection and a post plate, said catcher projection fixedly connected to one of said upper portion and said keel, said post plate fixedly connected to the other of said upper portion and said keel, said post plate having a plurality of projections extending from said post plate which define post position gaps, each adjacent pair of said projections defining one of said post position gaps therebetween, said post position gaps each configured to receive said catcher projection therein, said attachment device configured to adjustably pivotally connect said keel to said upper portion in such a way so as to allow said catcher projection to be received in one of said gaps between a pair of said post plate projections to lock said keel in any one of a variety of positions and orientations relative to said upper portion, wherein said keel is pivotally adjustably only within the horizontal plane in which it lies;

an anchor connected to said keel through an anchor attachment device; and whereby said decoy is configured to maintain a desired orientation and location with regard to a current when placed in a body of water and acted upon by wind or water current.

4. The decoy of claim 3 wherein said keel is able to be oriented divergent to said axis of said upper portion, within a parallel plane.

5. The decoy of claim 3 wherein said keel is a generally hollow tube having an open first end and an open second end and a generally hollow passageway extending therebetween.

* * * * *